(12) United States Patent
Ito et al.

(10) Patent No.: US 12,552,022 B2
(45) Date of Patent: Feb. 17, 2026

(54) LEARNING DEVICE AND ROBOT CONTROL SYSTEM

(71) Applicant: Hitachi, Ltd., Tokyo (JP)

(72) Inventors: Hiroshi Ito, Tokyo (JP); Hideyuki Ichiwara, Tokyo (JP); Kenjiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 18/576,395

(22) PCT Filed: Jun. 8, 2022

(86) PCT No.: PCT/JP2022/023048
§ 371 (c)(1),
(2) Date: Jan. 4, 2024

(87) PCT Pub. No.: WO2023/007954
PCT Pub. Date: Feb. 2, 2023

(65) Prior Publication Data
US 2024/0367314 A1    Nov. 7, 2024

(30) Foreign Application Priority Data
Jul. 28, 2021 (JP) ................ 2021-123255

(51) Int. Cl.
B25J 9/16 (2006.01)
(52) U.S. Cl.
CPC ............. B25J 9/163 (2013.01); B25J 9/1653 (2013.01); B25J 9/1697 (2013.01)
(58) Field of Classification Search
CPC ........ B25J 9/163; B25J 9/1653; B25J 9/1697; B25J 13/00; G06N 20/00
See application file for complete search history.

(56) References Cited

U.S. PATENT DOCUMENTS

| 8,964,351 B2 | 2/2015 | Horinouchi |
| 2013/0330162 A1 | 12/2013 | Horinouchi |
| 2023/0182296 A1* | 6/2023 | Sermanet ............... B25J 9/163 700/245 |

FOREIGN PATENT DOCUMENTS

| JP | 2002-337075 A | 11/2002 |
| JP | 2018-094645 A | 6/2018 |

(Continued)

OTHER PUBLICATIONS

International Search Report, PCT/JP2022/023048, Jul. 19, 2022, 2 pgs.
Written Opinion, PCT/JP2022/023048, Jul. 1, 2022, 4 pgs.

*Primary Examiner* — Dylan M Katz
(74) *Attorney, Agent, or Firm* — Volpe Koenig

(57) ABSTRACT

A learning device comprises: a learning unit that, using a model read from a model definition unit in accordance with a desired action of a robot, learns measurement information, captured images, and instruction information; a weight storage unit that stores a weight for a model learned by the learning unit; and an inference unit that, when instruction information is newly input, gives a weight read from the weight storage unit to a model read from the model definition unit, predicts an intention of the instruction information by applying, to the model, newly measured measurement information, a newly captured image, and newly input instruction information to the robot, infers a desired action of the robot, and an object which is the target of the desired action, and predicts a drive command for causing the robot to perform the desired action according to the intention of the predicted instruction information.

7 Claims, 7 Drawing Sheets

(56) References Cited

FOREIGN PATENT DOCUMENTS

| | | |
|---|---|---|
| JP | 2021-030407 A | 3/2021 |
| WO | 2013/099104 A1 | 7/2013 |

* cited by examiner

[FIG. 1A]
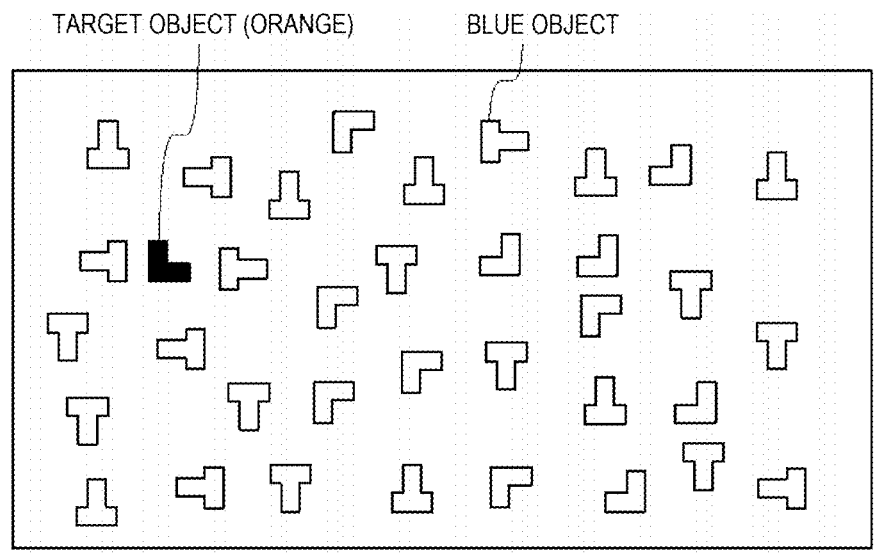
[FIG. 1B]
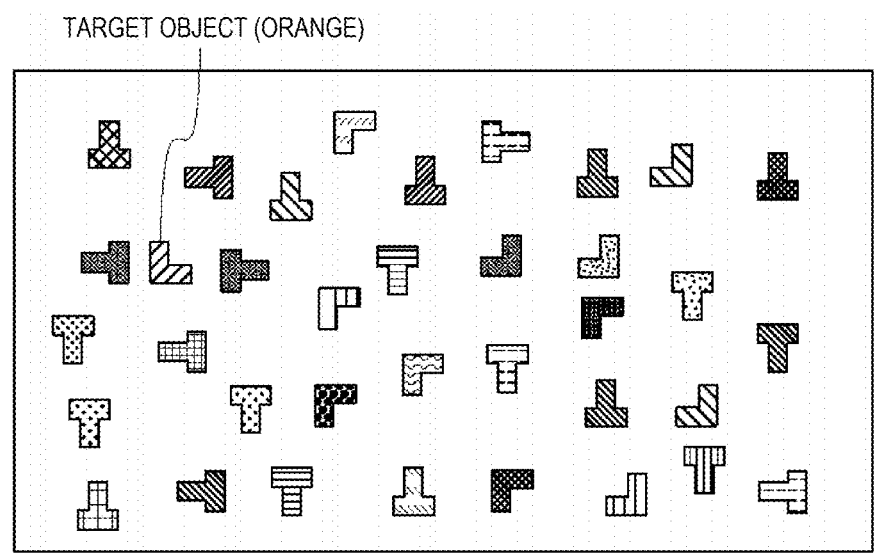

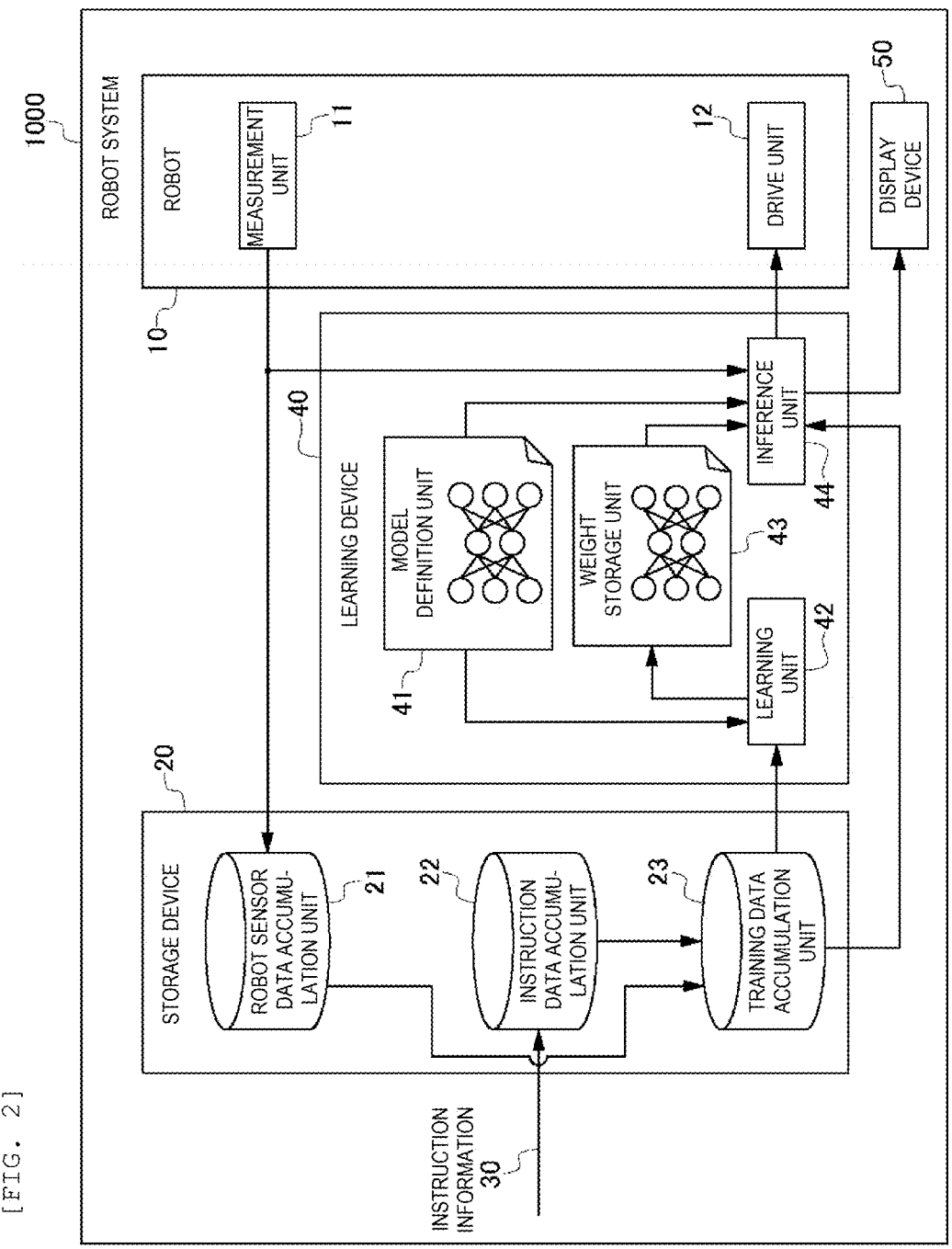
[FIG. 2]

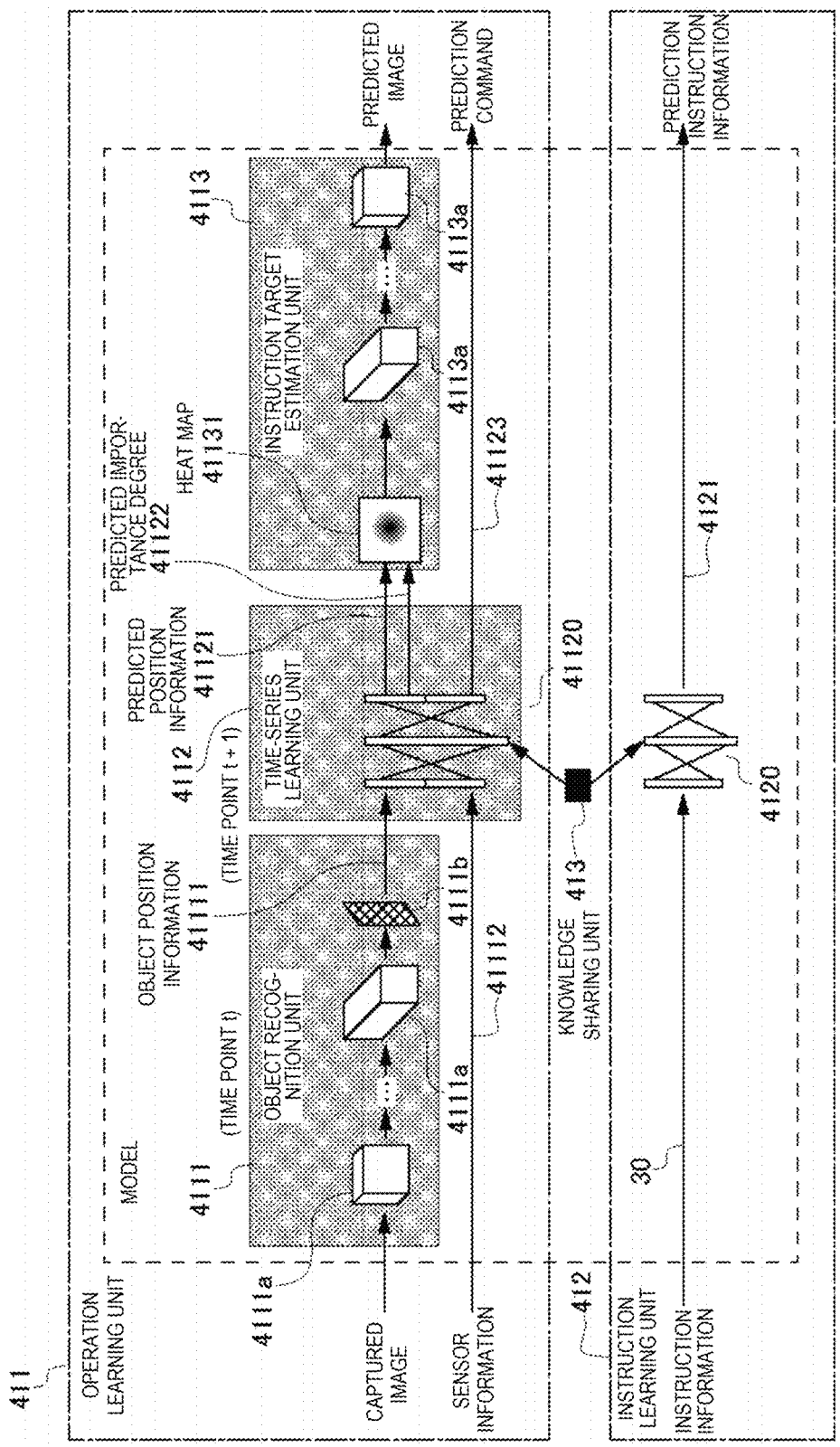
[FIG. 3]

[FIG. 4]
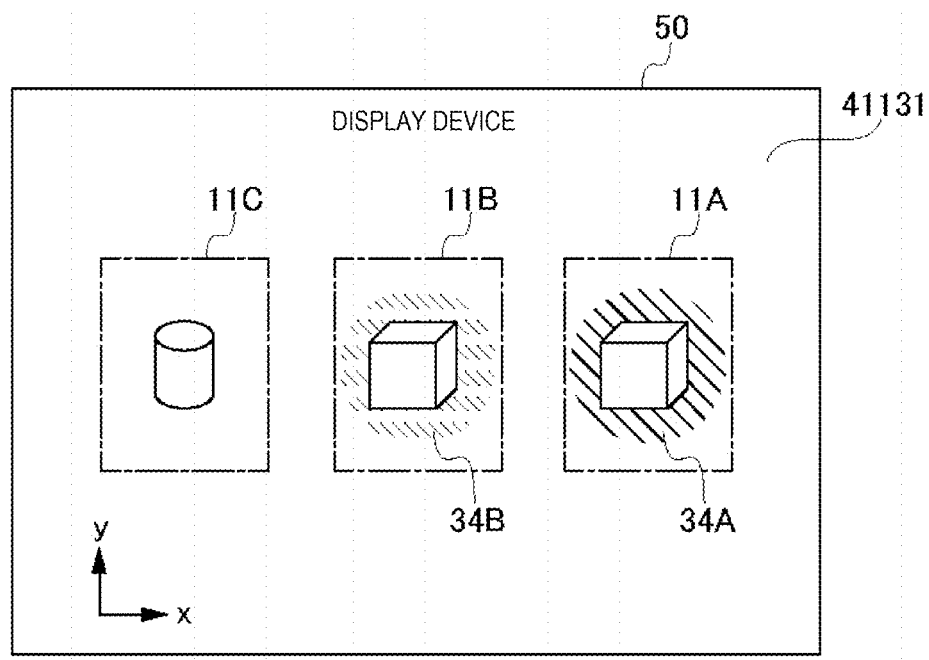
[FIG. 5]
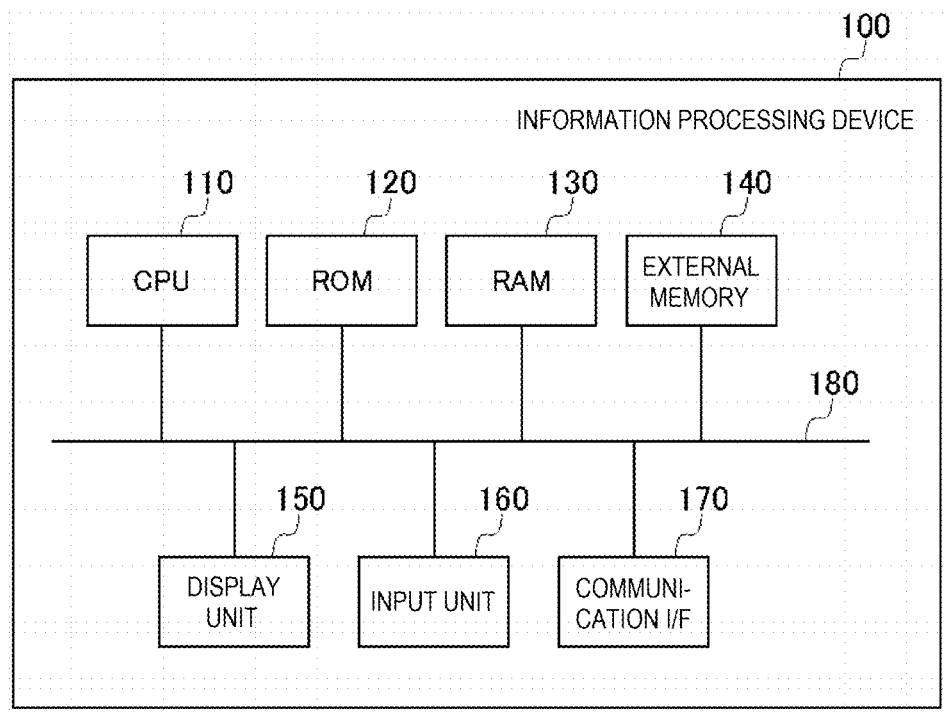

[FIG. 6]
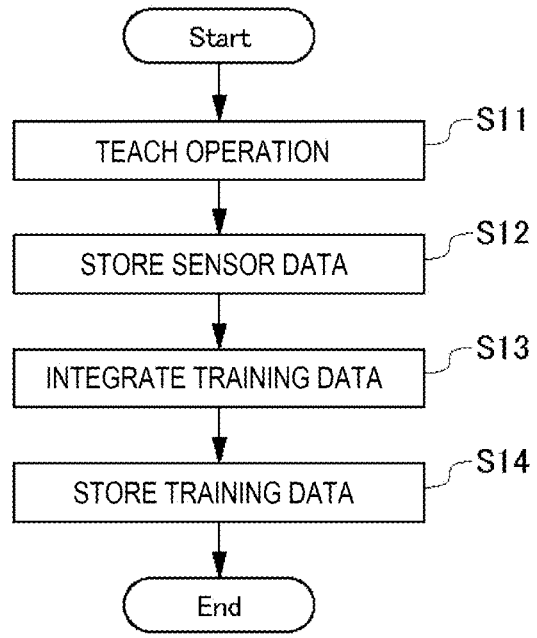
[FIG. 7]
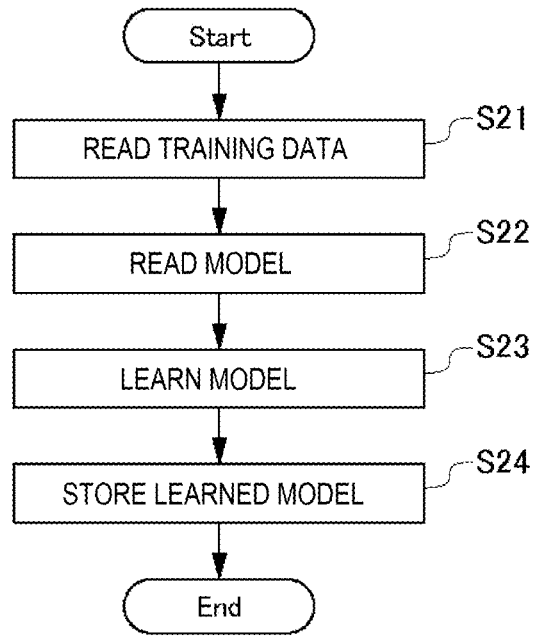

[FIG. 8]
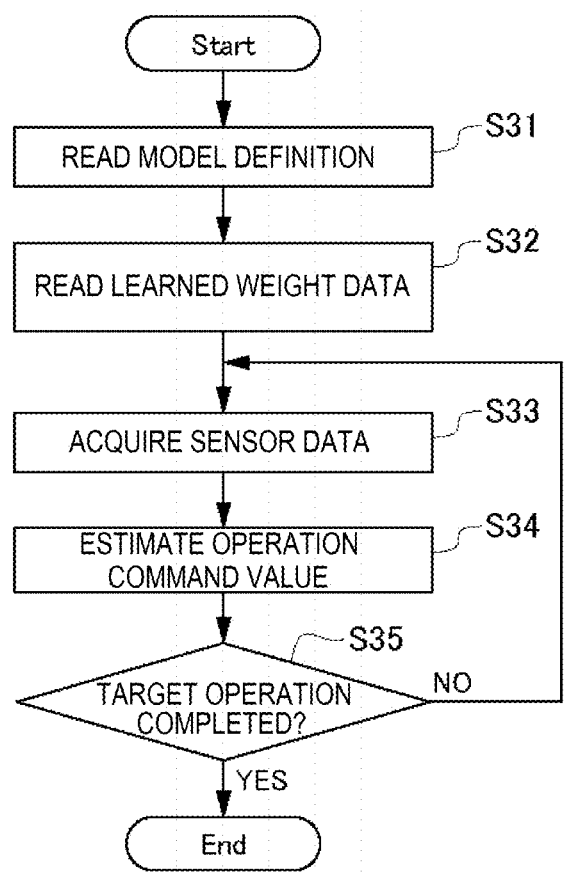

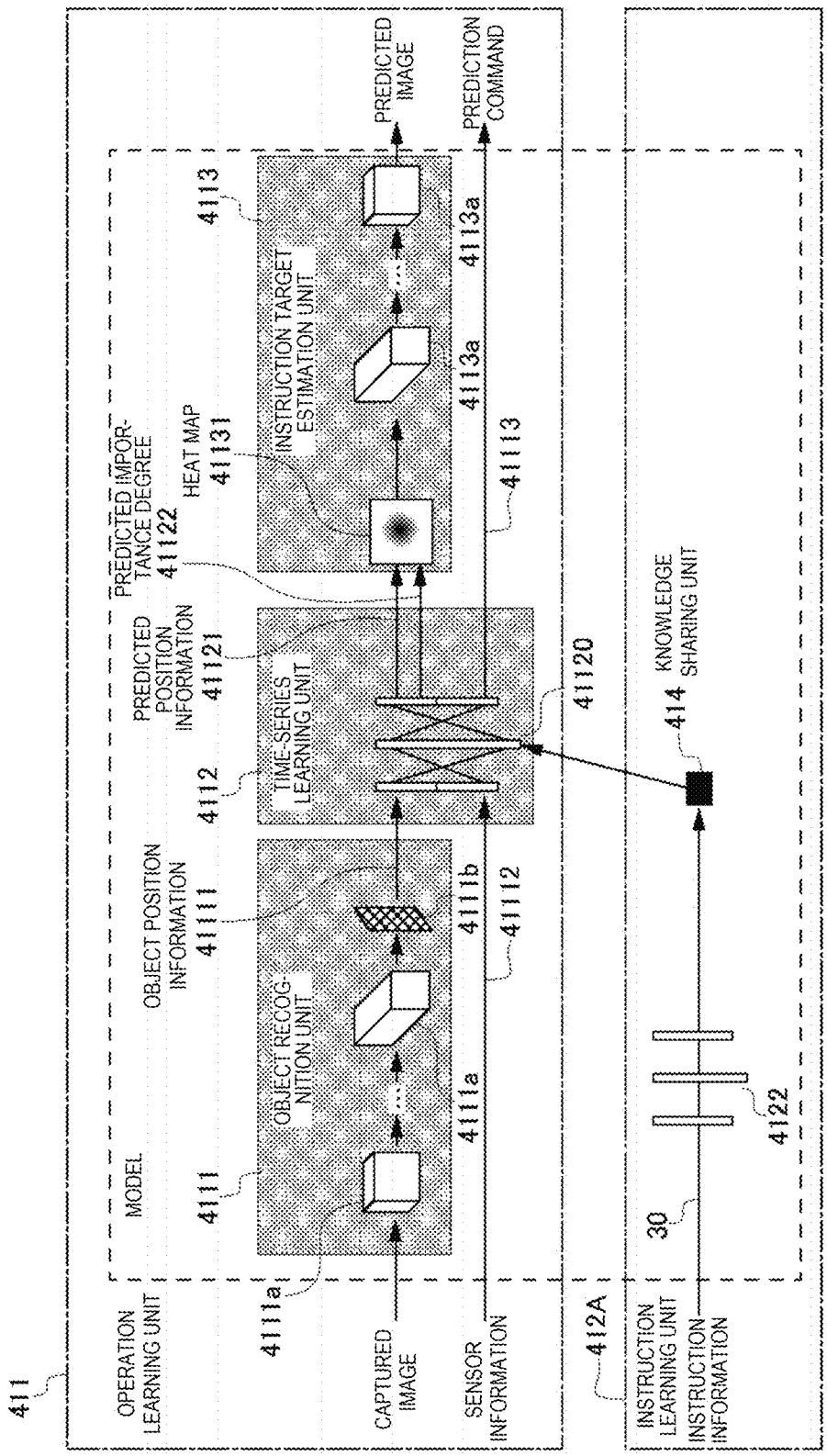

LEARNING DEVICE AND ROBOT CONTROL SYSTEM

TECHNICAL FIELD

The present invention relates to a learning device and a robot control system.

BACKGROUND ART

For example, in order for a person and a robot to work cooperatively at a manufacturing and construction site or the like, a technique is needed to enable the robot to appropriately understand and operate a work instruction given by a person and a work procedure manual. However, for the person operating the robot to program all commands for the robot, a huge amount of development man-hours and highly specialized knowledge are required. Therefore, a technique in the related art for enabling a robot to interpret an instruction given by a person has been studied.

PTL 1 discloses that "a legged mobile robot segments a relatively long teaching operation and other actions, and stores each segmented operation in association with an input symbol recognized by voice recognition or the like. Therefore, when reproducing an operation, a relatively long operation pattern can be easily instructed. In addition, even if the same action is not learned directly, by associating the operation with symbols input by a voice instruction, it is possible to develop an action closer to the instruction."

CITATION LIST

Patent Literature

PTL 1: JP2002-337075A

SUMMARY OF INVENTION

Technical Problem

By the way, in order for a person and a robot to work cooperatively, in addition to a technique for the robot to accurately recognize a surrounding situation, a technique is required for the robot to appropriately understand a language instruction uttered by the person and an instruction written in a work procedure manual, and to estimate an instructed object. With an improvement in an image recognition technique in recent years, a robot can recognize the surrounding situation and various objects with high accuracy.

However, in a method using the image recognition technique, only an object to which a label already learned by the robot is attached can be recognized, and an object of an unlearned label cannot be recognized. In addition, it is not realistic to learn in advance labels to be attached to all objects that exist in daily life.

In a robot operation in the related art, since an instruction given by a person and an operation of a robot correspond to each other in a one-to-one manner, the robot performs an operation of grasping the instructed object. However, an instruction word generally used by the person often includes an unlearned word or an abstract instruction. For example, an instruction is often given using Japanese ko-so-a-do demonstratives (instruction words) such as "pick that up", "pick up object on the right", and "pick up red object". Therefore, the robot is required to have an ability to determine the instructed object based on a current situation or past experience. Further, a reference point is necessary for the robot to recognize an instructed object to which a person instructs as "that" or "object on the right". However, it is difficult to estimate the reference point by a general image recognition method in which a robot comprehensively recognizes an object in an image.

Here, a situation in which the robot autonomously repeats a work in an environment such as a factory is examined. In the factory, it is assumed that a random picking work is performed in which the robot grasps objects stacked in bulk with an arm. In this work, the objects are often held in an order in which the robot recognizes the objects or in an order in which the robot is able to grasp the objects easily.

Further, it is assumed that a plurality of red objects of the same or similar shape are placed and an ambiguous instruction such as "pick up red object" is given. If a person receives the instruction, the person can select and grasp one object from among the plurality of objects that seem to match a content of the instruction. However, if a robot receives the instruction, the robot cannot select an object matching the content of the instruction, and the robot cannot know which object is to be picked up. In this way, the robot cannot autonomously select an object to be grasped, and therefore, it is not possible to plan a trajectory of an arm for the robot to grasp the object, that is, it is also not possible to determine an operation of the robot.

The invention has been made in view of such circumstances, and an object of the invention is to cause a robot to perform any operation even in a situation in which an instruction input to the robot is not clear and an object to be operated by the robot is unclear.

Solution to Problem

A learning device according to the invention includes: a model definition unit in which a model according to a target operation of a robot is defined; a learning unit configured to learn, using the model read from the model definition unit according to the target operation of the robot, measurement information in which an operation of the robot is measured, a captured image in which an object to be operated by the robot is imaged, and instruction information including an instruction word in which an operation instruction to the robot is verbalized; a weight storage unit configured to store a weight for the model learned by the learning unit; and an inference unit configured to, when instruction information to the robot is newly input, apply the weight read from the weight storage unit to the model read from the model definition unit and predict an intention of the instruction information by applying to the model newly measured measurement information, a newly captured image, and newly input instruction information to the robot, infer a target operation of the robot and an object to be a target of the target operation, and predict a drive command for causing the robot to perform the target operation according to the predicted intention of the instruction information.

Advantageous Effects of Invention

According to the invention, even in a situation in which an instruction input to a robot is not clear and an object to be operated by the robot is unclear, it is possible to cause the robot to perform any target operation which is inferred by predicting an intention of the instruction.

Problems, configurations, and effects other than those described above will become apparent in the following description of embodiments.

BRIEF DESCRIPTION OF DRAWINGS

FIG. 1A is a diagram showing a bottom-up attention mechanism.

FIG. 1B is a diagram showing a top-down attention mechanism.

FIG. 2 is a block diagram showing a configuration example of a robot system including a learning device according to a first embodiment of the invention.

FIG. 3 is a block diagram showing an example of a model according to the first embodiment of the invention.

FIG. 4 is a diagram showing a specific display example of a heat map according to the first embodiment of the invention.

FIG. 5 is a diagram showing an example of a hardware configuration of an information processing device according to the first embodiment of the invention.

FIG. 6 is a flowchart showing an example of operation teaching processing performed by the robot system according to the first embodiment of the invention.

FIG. 7 is a flowchart showing an example of operation learning processing performed by the robot system according to the first embodiment of the invention.

FIG. 8 is a flowchart showing an example of operation generation processing performed by the robot system according to the first embodiment of the invention.

FIG. 9 is a block diagram showing an example of a model according to a second embodiment of the invention.

DESCRIPTION OF EMBODIMENTS

Hereinafter, embodiments according to the invention will be described with reference to the accompanying drawings. In the specification and the drawings, components that have substantially the same function or configuration are denoted with the same reference numerals, and repeated description thereof is omitted.

DEFINITION OF TERMS

First, a definition of terms described in the specification will be described.

"Sensor data" is a measured value of a sensor (a joint angle, a current value, a torque value, a tactile value, a captured image, or the like) that measures a state of each drive unit (actuator) of a robot, or a measured value of a sensor (a camera, a motion capture, or the like) that is attached to the outside of the robot and measures a surrounding situation.

"Training data" is a series of sensor data used in training when a target operation is taught to the robot, and is stored in time series. The training data is data in which sensor data measured at a plurality of time points and instruction information of a language instruction issued to the robot are associated.

The "target operation" is an operation performed by the robot. The target operation is given to the robot based on instruction information 30 (see FIG. 2 to be described later) according to a voice instruction of a person, text input, or the like.

Findings by Present Inventor

As described above, machine learning is focused as a method for implementing complicated recognition and identification with high accuracy, which is difficult until now. Therefore, the present inventor studies, using the machine learning, a learning device capable of predicting a target operation of a robot based on an ambiguous instruction and allowing the robot to perform the predicted target operation. An example of the learning device is shown as a learning device 40 in FIG. 2 to be described later.

The learning device can autonomously generate an operation to be performed by the robot even if an environment around the robot changes by learning the target operation taught to the robot. In a robot system in the related art, there are many integrated techniques in which a language processing unit that understands an instruction given by a person and an operation generation unit for a robot are individually developed. In the method, a word recognized by the language processing unit and an operation are made to correspond to each other in a one-to-one manner, and a correspondence relationship is recorded in a database to implement an operation based on an instruction. However, the method has a problem in that when an instruction not recorded in the database is input to the learning device, the learning device cannot generate an appropriate operation for the robot.

In the technique disclosed in PTL 1 described above, the operation generation unit estimates an operation of the robot based on a feature extracted by the language processing unit. However, for example, when "pick up red object" is indicated in a state in which a plurality of red objects with the same shape or similar shape are placed, the robot cannot know which object is to be picked up, and the operation has to be stopped.

Here, neuroscience reveals that there are two types of attention mechanisms of a bottom-up type and a top-down type in human visual information processing. The two types of attention mechanisms will be described with reference to FIGS. 1A and 1B.

FIGS. 1A and 1B are diagrams showing the two types of attention mechanisms of the bottom-up type and the top-down type. FIG. 1A is a diagram showing the bottom-up attention mechanism. In addition, FIG. 1B is a diagram showing the top-down attention mechanism.

The bottom-up attention mechanism is a mechanism related to attention which is instantaneously determined from visual information, and passively attracts attention of a person in a situation different from surroundings. For example, when a person searches for a target object (an upright L-shaped object), if there is only one orange target object in a large number of blue objects as shown in FIG. 1A, the target object is conspicuous. Therefore, the person can easily find the target object.

On the other hand, in the top-down attention mechanism, attention of a person can be paid by actively applying a bias to a specific spatial position or a feature based on knowledge, prediction, or the like obtained in advance. For example, as shown in FIG. 1B, it is assumed that the target object is not conspicuous in a situation in which objects of various shapes and colors are mixed. Even in this situation, a person can find out the target object by paying attention to a target position or a feature. For reference, it is assumed that the target objects shown in FIGS. 1A and 1B (the upright orange L-shaped objects) are located at the same location.

The technique disclosed in the present specification targets a manipulation work of a robot that operates based on an instruction from a person or a machine. Object grasping will be described as an example of the manipulation work.

A general object recognition technique can be said to be the bottom-up type by instantaneously recognizing a wide variety of objects based on the visual information. Therefore, when the object recognition technique is applied to a technique of grasping an object by a robot, it is necessary for the robot to autonomously determine an object to be grasped based on an index which is a plurality of recognition results, for example, an index referred to as ease of grasping an object by the robot or a front-back positional relationship of objects.

When the instruction information of a person is clear, the learning device in the related art can sequentially generate a grasping operation for the robot based on the object to be grasped in a visual image of the robot and a state of the robot. For example, even in a situation in which a plurality of objects having different colors and shapes are placed, the robot can select an appropriate object according to an instruction given by a person and grasp the selected object. However, in an ambiguous situation, for example, in a situation in which a plurality of objects with the same or similar shapes are placed, it is difficult to uniquely identify the object to be grasped. In order for the robot to appropriately determine the instruction given by the person, the robot is required to have the ability to understand an intention of the instruction given by the person and determine the object based on learning experience, surrounding situations, and context.

Therefore, the inventor invents a learning device that can learn a relationship between an instruction given by a person and an object and an importance degree of the object, and generates a target operation of the robot. In this method, the learning device can uniquely identify an object to be grasped based on a plurality of pieces of information obtained by identifying a plurality of objects. Therefore, even in a situation in which a plurality of objects with the same or similar shape are placed, the learning device can uniquely identify the object to be grasped and generate a grasping operation of the robot. Further, since the learning device generates the object grasping operation while focusing on the object to be grasped, it is possible to generate an operation that is robust against a surrounding environment change and environmental noise. A detailed configuration example and an operation example of the learning device according to embodiments of the invention will be described below.

First Embodiment

Here, the learning device according to a first embodiment of the invention will be described in detail with reference to the accompanying drawings. The embodiments described below are examples of a method for implementing the present disclosure, and are to be appropriately modified or changed according to a configuration and various conditions of a device to which the present disclosure is applied, and the present disclosure is not limited to the following embodiments.

First, a robot system according to the first embodiment of the invention will be described.

FIG. 2 is a block diagram showing a configuration example of a robot system 1000 including the learning device 40.

The robot system 1000 includes a robot 10, a storage device 20, the learning device 40, and a display device 50. The robot 10 performs an operation such as grasping an object based on a prediction command generated by the learning device 40 interpreting and generating the instruction information 30.

In the robot system 1000 according to the embodiment, first, a person or the like teaches a desired target operation to the robot 10 (an example of a robot device). As the desired target operation, for example, there is an operation in which the robot 10 grasps an object at a specific position and moves the object to another position. In this way, one grasping operation in which the robot 10 actually grasps the object is referred to as "operation teaching".

In the operation teaching, a method of remotely operating the robot 10 by a person using a remote control device or a method such as direct teaching in which a person directly operates the robot is used to teach a desired manipulation operation (hereinafter, abbreviated as an "operation") to the robot 10. The robot 10 is taught various operations such as stretching an arm (not shown) toward the object, bending a joint at a predetermined angle, and a timing to open a grasping unit.

While the robot 10 is subjected to the operation teaching, a sensor (not shown) measures a device of each unit of the robot 10 to obtain robot sensor data and outputs the robot sensor data to the storage device 20. A robot sensor data accumulation unit 21 accumulates time-series robot sensor data associated with the operation teaching. The robot sensor data includes, for example, sensor information (an arm joint angle, a torque value, a current value of a motor current, and the like) measured by a measurement unit 11 when actually manipulating the target object. In addition, the robot sensor data also includes a captured image (a depth image and the like) imaged by a camera attached to the surroundings of the robot 10 or the robot 10 itself. Therefore, the measurement unit 11 includes a camera.

The storage device 20 stores and accumulates the robot sensor data acquired from the robot 10 and the instruction information 30 input to the robot system 1000. The storage device 20 includes the robot sensor data accumulation unit 21, an instruction data accumulation unit 22, and a training data accumulation unit 23.

As described above, the robot sensor data accumulation unit 21 accumulates the sensor information and the captured image input from the robot 10 as the robot sensor data.

The instruction data accumulation unit 22 accumulates, as instruction data, the instruction information 30 input from outside of the robot system 1000. The instruction information 30 is information including a language instruction corresponding to an operation taught to the robot in a one-to-one manner. For example, when the robot 10 is taught an operation of picking up a red object, a text of "pickup red object" is recorded as the corresponding instruction information. In this way, the language instruction includes text information identifying only a color of an object, such as "pick up red object", and information identifying only a type of an object, such as "pick up plastic bottle". The instruction information 30 may be a work procedure manual or human voice in addition to the text.

The training data accumulation unit 23 accumulates, as the training data, information in which the robot sensor data (the sensor information) and the captured image acquired from the robot sensor data accumulation unit 21 and the instruction data (the instruction information 30) acquired from the instruction data accumulation unit 22 are associated with each other in a one-to-one manner. In the present specification, a summary of the robot sensor data, the captured image, and the instruction data is referred to as the "training data".

While the target operation is taught to the robot 10, the learning device 40 learns information necessary for the robot 10 to perform the target operation by using the robot sensor data and the instruction data. When the instruction information 30 is input again after the operation teaching, the learning device 40 can autonomously generate an operation to be performed by the robot 10. Here, the input instruction information 30 may not be exactly the same as the instruction information 30 input when the target operation is taught to the robot 10. A part of the language instruction input as the instruction information 30 may be missing or may be expressed in a different manner. Further, the robot 10 can execute the target operation based on the prediction command generated by the learning device 40 based on the input instruction information 30.

The learning device uses 40 a model (a network configuration) in a model definition unit 41 defined in advance by a person and the training data accumulated in the training data accumulation unit 23 to learn an optimal parameter of a model in a learning unit 42 according to an objective function. The learning device 40 is used as an example of an information processing device implemented in the robot system 1000. The learning device 40 includes the model definition unit 41, the learning unit 42, a weight storage unit 43, and an inference unit 44.

(Learning Processing)

The learning device 40 machine-learns the model using the training data generated by the storage device 20. Further, the learning device 40 recognizes the target object indicated by the instruction information 30 using the learned model, and generates a desired manipulation operation. The learning unit 42 of the learning device 40 according to the embodiment learns a model using, for example, a convolutional neural network (CNN) and a recurrent neural network (RNN), each of which is a kind of deep learning.

The model definition unit 41 stores any machine learning model (for example, a network configuration of a neural network) defined in advance by a person. In the following description, the machine learning model is abbreviated as a "model". A model matching the target operation of the robot 10 is defined in the model definition unit 41. The model includes parameters for learning by the learning unit 42. FIG. 3 to be described later shows an example of a model represented by a plurality of blocks (parameters) and data flows (arrows). In the model definition unit 41, different models are prepared according to a task (the target operation) executed by the robot 10. For example, there are a model corresponding to a task in which the robot 10 grasps an object, and a model corresponding to a task in which the robot 10 fastens a screw. In the embodiment, it is assumed that the model corresponding to the task in which the robot 10 grasps an object is selected.

The learning unit 42 reads the training data from the training data accumulation unit 23 of the storage device 20. As described above, the training data is data in which the measurement information, the captured image, and the instruction information 30 are collected. The learning unit 42 learns, using the model read from the model definition unit 41 according to the target operation of the robot 10, the measurement information (the robot sensor data) in which the operation of the robot 10 is measured, the captured image in which an object to be operated by the robot 10 is imaged, and the instruction information 30 including an instruction word in which the operation instruction to the robot 10 is verbalized. The learning unit 42 can read the model from the model definition unit 41 and switch the model to be used for learning depending on the task executed by the robot 10.

The weight storage unit 43 stores a weight and a bias for the model learned by the learning unit 42.

The weight is, for example, a value added to a parameter (an optimal parameter) when the learning unit 42 learns using the training data and optimizes the model. The objective function of the learning unit 42 is identified by a person. FIG. 3 to be described later shows an example of the model defined by the model definition unit 41 according to the embodiment and an example of the learning unit 42 that learns the operation of the robot 10 in response to the instruction information 30 using the model.

(Inference Processing)

The learning device 40 predicts an intention based on the instruction information 30 acquired from the storage device 20, infers, based on the instruction information 30 and the training data, a target operation indicated by the instruction information 30 and an object, and outputs an inference result to the robot 10. The robot 10 can perform the operation of grasping a specific target based on the inference result.

Therefore, when the instruction information 30 to the robot 10 is newly input, the inference unit 44 uses a model for inference processing by applying the weight read from the weight storage unit 43 to the model read from the model definition unit 41. Further, the inference unit 44 uses the weighted model to identify the object to be operated by the robot 10 from the captured image of the newly imaged object, and predicts a drive command based on the newly measured measurement information.

Further, the inference unit 44 predicts the intention of the instruction information 30 by applying, to the model, the newly measured measurement information (the robot sensor data), the newly imaged captured image, and the newly input instruction information 30 to the robot 10, and infers a target operation of the robot 10 and an object that is the target of the target operation. Further, the inference unit 44 infers prediction instruction information 4121 (see FIG. 3 to be described later) based on the read instruction information 30. In addition, the inference unit 44 predicts a drive command for causing the robot 10 to perform the target operation according to the intention of the predicted instruction information 30, and outputs a predicted drive command (a prediction command 41123 shown in FIG. 3 to be described later) to a drive unit 12.

The inference unit 44 performs the inference processing using a learning model and the robot sensor data to generate the prediction command 41123 (see FIG. 3 to be described later) in which an operation command value of a manipulator is predicted. The prediction command 41123 is input to the drive unit 12 of the robot 10 as command data for the robot 10, and the drive unit 12 is driven based on the command data.

During the inference processing, the measurement unit 11 measures the sensor information according to driving of the drive unit 12, and outputs the robot sensor data. The sensor information is accumulated in the robot sensor data accumulation unit 21, and is taken into the inference unit 44. Therefore, the inference unit 44 generates the prediction command 41123 based on the sensor data input in the real time, and drives the drive unit 12 of the robot 10. The inference processing is repeatedly performed until the target operation of the robot 10 is completed.

Next, a configuration for learning the operation of the robot 10 and a configuration for learning the instruction information 30 among the models defined in the model definition unit 41 will be described with reference to FIG. 3.

FIG. 3 is a block diagram showing an example of the model. A portion surrounded by a broken line in FIG. 3 represents the model stored in the model definition unit 41. In addition, a portion surrounded by a dashed-dotted line in FIG. 3 represents a functional unit that the learning unit 42 learns using the model. As described above, the model is used in the inference processing by the inference unit 44 after the learning unit 42 learns and optimizes the model.

First, a configuration example of the learning unit 42 will be described.

The learning unit 42 includes an operation learning unit 411, an instruction learning unit 412, and a knowledge sharing unit 413.

The operation learning unit 411 learns, based on the training data read from the training data accumulation unit 23, a correspondence relationship between the operation of the robot 10 to which the target operation is taught and the training data. Functions of an object recognition unit 4111 can be implemented using a generally widely used object recognition technique. For example, it is possible to implement the object recognition unit 4111 that uses a machine learning method (yolo, SSD, or the like) specialized for object recognition, position information recognized by a QR and AR marker or the like, position information recognized from a color center of gravity of the object, and the like.

The operation learning unit 411 the object includes recognition unit 4111, a time-series learning unit 4112, and an instruction target estimation unit 4113. A combination of a large number of blocks (filters) included in the object recognition unit 4111, the time-series learning unit 4112, and the instruction target estimation unit 4113 represents the model defined by the model definition unit 41. Then, the captured image and the sensor information read from the training data accumulation unit 23 are input to the operation learning unit 411.

The object recognition unit 4111 recognizes a shape and a position of the object that is the target of the target operation of the robot 10 from the captured image included in the training data read from the training data accumulation unit 23. For example, the object recognition unit 4111 performs processing of recognizing, based on the captured image imaged by the camera at a certain time point t, the position and the shape of the object at the time point t. Therefore, the object recognition unit 4111 extracts object position information 41111 representing the position of the object using CNN that extracts image features and SpatialSoftmax that extracts spatial position information of the object. The SpatialSoftmax is a type of function used in machine learning, such as Softmax function, tanh, and sigmoid function, and is also called soft argmax. The number of object position information 41111 extracted by the SpatialSoftmax is determined based on the number of filters of the previous CNN.

In the object recognition unit 4111, the number of parameters (weights) of the machine learning is represented by blocks 4111a. Each block 4111a represents a layer of the learning processing executed by the object recognition unit 4111. Further, the longer a length of the block 4111a in a depth direction means that more parameters are included in the layer of the model represented by a matrix. For example, the block 4111a on the right side includes more parameters than the block 4111a on the left side of the object recognition unit 4111. Further, a combination of parameters in each block 4111a is represented by arrows between the plurality of blocks 4111a.

Further, the captured image input to the object recognition unit 4111 first passes through the block 4111a on the left side, so that processing is performed such that a point with a high degree of attention is set to "1" and a point with a low degree of attention is set to "0". The same processing is also performed in the plurality of subsequent blocks 4111a. The object recognition unit 4111 gradually recognizes the object in the captured image by passing the captured image through the plurality of blocks 4111a, and optimizes the parameters. The parameters (weights) of the optimized model are stored in the weight storage unit 43 shown in FIG. 2.

A flat plate 4111b represents, for example, the above-described Spatial Softmax. When the captured image output from the block 4111a on the right side is input to the flat plate 4111b, the number of object position information 41111 indicating the position of the object is extracted by the Spatial Softmax. The number of extracted object position information 41111 is output to the time-series learning unit 4112.

The time-series learning unit 4112 learns and predicts the position of the object after a predetermined time after the object recognition unit 4111 recognizes the shape and the position of the object based on a learning result of the instruction information 30 acquired from the knowledge sharing unit 413 and the shape and the position of the object input in time series from the object recognition unit 4111. The time-series learning unit 4112 learns and predicts an importance degree of the position of the object after the predetermined time. Further, the time-series learning unit 4112 learns and predicts a command to the robot 10 based on the learning result of the instruction information 30. Since processing of determining the position of the object from the object position information extracted 41111 by the SpatialSoftmax of the object recognition unit 4111 is instantaneously determined based on the visual information, the time-series learning unit 4112 corresponds to the above-described bottom-up attention mechanism.

For example, a plurality of pieces of object position information 41111 extracted by the operation learning unit 411 at the time point t and the sensor information 41112 of the robot 10 measured at the time point t are input to the time-series learning unit 4112. A network 41120 defined by the model is provided in the time-series learning unit 4112.

The network 41120 provided in the time-series learning unit 4112 receives, from the object recognition unit 4111, the plurality of pieces of object position information 41111 at the time point t and the sensor information 41112 of the robot 10 at the time point t. In addition, the network 41120 receives, from the knowledge sharing unit 413, a variable corresponding to the instruction information 30 as the learning result.

Further, the time-series learning unit 4112 generates a prediction command for instructing the position of the object predicted at a time point t+1, the importance degree of the predicted position, and the operation of the robot 10 using the network 41120 according to the variable input from the knowledge sharing unit 413. For example, the time-series learning unit 4112 predicts predicted position information 41121 indicating the position of the object at the time point t+1, predicted importance degree 41122 of the predicted position information 41121, and the prediction command 41123. The prediction command 41113 includes information such as a joint angle of a joint portion of an arm of the robot 10. The time-series learning unit 4112 can change, based on the learning result of the instruction information 30 acquired from the knowledge sharing unit 413, the position of the object after the predetermined time (the predicted position information 41121) and the importance degree (the predicted importance degree 41122) and the target operation of the robot 10.

The predicted position information 41121 and the predicted importance degree 41122 are output to the instruction target estimation unit 4113. The prediction command 41123 is output to the drive unit 12 shown in FIG. 2, and the drive unit 12 drives each device of the robot 10 based on the prediction command 41123.

The instruction target estimation unit 4113 estimates, based on the position of the object after the predetermined time predicted by the time-series learning unit 4112, the object to which the operation instruction is given based on the instruction information 30. At this time, the instruction target estimation unit 4113 creates a heat map 41131 of the object included in the captured image based on the predicted position of the object (the predicted position information 41121) and the importance degree (the predicted importance degree 41122) after the predetermined time, applies the model to the heat map 41131, and outputs the predicted image predicted to be imaged after the predetermined time. The predicted image is, for example, an image representing a shape of a plastic bottle when the object grasped by the robot 10 is a plastic bottle.

Here, a configuration example of the heat map 41131 will be described.

The heat map 41131 represents, for example, using light and dark of color, a position of an object included in an imaging view angle of the camera when a direction of the camera is fixed, and is generated according to the object included in the captured image. For example, when there are three objects in the imaging view angle, three heat maps 41131 are generated.

In the heat map 41131, a darkly displayed portion is a point candidate representing an object predicted as the object grasped by the robot 10. When a plurality of important point candidates are present, the instruction target estimation unit 4113 can predict an object more accurately by inputting an addition instruction to the operation learning unit 411. In initial learning by the operation learning unit 411, the heat map 41131 is displayed at a random portion in an imaging region. When the learning of the operation learning unit 411 progresses and the model is optimized, in the heat map 41131, a center position of an emphasized portion emphasized in a dark color approaches a position of an actual object.

The instruction target estimation unit 4113 sets the predicted position information 41121 as the center position of the heat map 41131, and associates the predicted importance degree 41122 with a radius of the emphasized portion that is emphasized in a dark color in the heat map 41131. The radius of the emphasized portion varies depending on the predicted importance degree 41122. Therefore, it is indicated that the higher the predicted importance degree 41122 is, the larger the emphasized portion is, indicating that the object is to be selected as a grasping target. In this way, the darker the emphasized portion included in the heat map 41131, the more important the point can be considered. This means that the instruction target estimation unit 4113 can accurately predict the position where the object is present at the time point t+1.

FIG. 4 is a diagram showing a specific display example of the heat map 41131. A horizontal axis of the heat map 41131 represents an X coordinate, and a vertical axis represents a Y coordinate.

FIG. 4 shows heat maps 11A to 11C as an example of the heat map 41131. For example, the heat map 11A in which a cubic object is displayed on the right side, the heat map 11B in which a cube is displayed in the middle, and the heat map 11C in which a cylindrical object is displayed on the left side are displayed. Even if the cylindrical object and the two cubic objects overlap in a depth direction when viewed from an imaging direction of the camera, by using a depth image including depth information, the instruction target estimation unit 4113 can identify between an object in the front and an object in the back.

Here, it is assumed that the instruction issued to the robot 10 is to grasp the cubic object.

In the instruction, the cylindrical object is out of the object, and the heat map 11C does not include any emphasized portion. That is, it can be seen that the cylindrical object shown in the heat map 11C is not predicted as the grasping target of the robot 10.

On the other hand, in the heat maps 11A and 11B, colors are displayed in a darker color with the same radius from the center of the object. However, it is assumed that the colors become darker in the order of emphasized portions 34B and 34A. The darker color indicates the object predicted to be closer to the instruction of being grasped by the robot 10. Therefore, the robot 10 performs an operation of grasping the object shown in the heat map 11A. At this time, when the person views the heat map 41131 displayed on the display device 50 and checks that an inappropriate object is selected as the grasping target, the person can make corrections such as selecting an appropriate object again.

Referring back to FIG. 3, the content of the model will be described.

At the end of the learning by the operation learning unit 411, the heat map 41131 is displayed at a portion where the object is actually present. For example, when the object grasped by the robot 10 is the plastic bottle, the heat map 41131 is generated in which the portion where the plastic bottle is present is emphasized in a dark color.

The instruction target estimation unit 4113 can generate one or more heat maps 41131 in one imaging region and indicate the positions of the plurality of objects. That is, the instruction target estimation unit 4113 can generate a desired number of heat maps 41131.

Further, at least one of the heat map 41131, the predicted image, and the predicted commands to the robot 10 is output so as to be displayed on the display device 50 (see FIG. 2). Therefore, the person can check, based on the heat map 41131 displayed on the display device 50, whether the actual position of the object matches the position of the emphasized portion.

Similarly to the object recognition unit 4111, the instruction target estimation unit 4113 also includes a plurality of blocks 4113a. The heat map 41131 is combined with the block 4113a having a long depth (having large number of parameters). Further, the blocks 4113a of the instruction target estimation unit 4113 repeat the combination in each layer and output a predicted image based on the block 4113a at the right end.

In this way, the learning device 40 predicts the position of at least one object representing an object that is a target of the target operation instructed to the robot 10 and the importance degree of at least one object.

In the learning processing, the object recognition unit 4111 extracts position information of the object and a label added to the object from an input captured image. The instruction learning unit 412 extracts the intention of the instruction from the input instruction information 30. Further, the time-series learning unit 4112 learns an attention point and an importance degree based on an object recognition result and a recognition result of an abstract instruction.

During the inference processing, when a new instruction is given to the robot 10 and the training data is acquired, the inference unit 44 predicts the position of at least one object using the model. Further, the inference unit 44 can focus on an object whose importance degree (the predicted importance degree 41122) predicted by the time-series learning unit 4112 is higher than other predicted importance degrees, and output a drive command (the prediction command 41123) for causing the robot 10 to perform the target operation so that the object is set as the target of the target operation. Therefore, the robot 10 can execute the target operation according to the input new instruction. When there is only one object in the captured image, the inference unit 44 determines that the predicted importance degree 41122 for the object is the highest.

The instruction learning unit 412 shown on the lower side of FIG. 3 predicts the intention of the instruction information 30 based on the learning result obtained by learning a correspondence between the instruction information 30 read from the training data accumulation unit 23 and the measurement information in which the operation of the robot 10 whose target operation is taught is measured. Therefore, the instruction learning unit 412 performs time-series learning of the instruction information 30 corresponding to the robot sensor data input in time series. For example, when it takes five seconds for the robot 10 to complete the target operation after starting an operation based on one piece of instruction information 30, the one piece of instruction information 30 is associated with the robot sensor data measured in five seconds.

The instruction learning unit 412 is provided with a network 4120 defined by the model read from the model definition unit 41. The instruction learning unit 412 outputs the prediction instruction information 4121 from the input instruction information 30 using the network 4120.

The knowledge sharing unit 413 shares the learning result (knowledge) of the instruction information 30 by the instruction learning unit 412 with the operation learning unit 411. Therefore, the knowledge sharing unit 413 connects the operation learning unit 411 and the instruction learning unit 412. The knowledge sharing unit 413 accesses the network 41120 of the operation learning unit 411 and the network 4120 of the instruction learning unit 412. Further, the knowledge sharing unit 413 learns one variable for the operation of one robot 10 and the instruction information thereof. In this way, the knowledge sharing unit 413 can extract a variable indicating the intention of the instruction from the instruction information 30 input to the instruction learning unit 412. The knowledge sharing unit 413 is represented by a multiple dimensional variable in which a relationship between the operation and the instruction is learned. The variable of the knowledge sharing unit 413 is stored in the weight storage unit 43.

When the variable extracted by the knowledge sharing unit 413 is input, the time-series learning unit 4112 can generate the prediction command 41123 corresponding to the instruction. The instruction learning unit 412 to which the variable of the knowledge sharing unit 413 is input can generate an instruction (the prediction instruction information 4121) corresponding to the operation of the robot 10.

For example, when the instruction learning unit 412 predicts that the input instruction information 30 includes the language instruction of "pick up red object", the instruction learning unit 412 can output the language instruction of "pick up red object" as the prediction instruction information 4121. In addition, even if the language instructions included in the input instruction information 30 are fluctuating, such as "I want red object" or "red object, please", the instruction learning unit 412 can interpret the language instruction and set the language instruction to the same content as "select red object and grasp and move it". It is possible to output, as the prediction instruction information 4121, the content of "select red object and grasp and move it". Further, the knowledge sharing unit 413 extracts a variable according to the content of "select red object and grasp and move it". Therefore, when the variable is input from the knowledge sharing unit 413, the time-series learning unit 4112 can output the prediction command 41123 according to the variable.

In the specification, the generation of the operation of the robot 10 based on the language instruction learned by the knowledge sharing unit 413 is expressed as "using a variable". By using the variable of the knowledge sharing unit 413, the input instruction information 30 and the target operation of the robot 10 can be linked. The operation learning unit 411 and the instruction learning unit 412 according to the embodiment are connected only by the knowledge sharing unit 413. For example, the knowledge sharing unit 413 stores, as one variable, the language instruction referred to as "pick up" by learning and the operation of the robot 10 corresponding to the language instruction. That is, by inputting the variable for which the language referred to as "pick up" is learned into the operation learning unit 411, the operation corresponding to the variable is generated.

As described above, the variable extracted by the knowledge sharing unit 413 is formed in multiple dimensions, the variable associated with information such as "pick up red object" or "push red object" are represented as a predetermined numerical value. Therefore, in addition to the language instruction referred to as "pick up", for example, a variable corresponding to a language instruction such as "push" may be input to the time-series learning unit 4112 from the knowledge sharing unit 413. At this time, a variable corresponding to the language instruction such as "push" is extracted by the knowledge sharing unit 413. Such a variable has a different value for each language instruction, and is used as, for example, an index. For example, "1" is assigned to the information "pick up red object as the variable", and "2" is assigned to the information "push red object" as the variable.

Further, similar to the language instruction referred to as "pick up", the time-series learning unit 4112 of the model used in the inference unit 44 generates the operation of the robot 10 using the variable (a value corresponding to "push") extracted from the knowledge sharing unit 413, and outputs an instruction for driving the drive unit 12 as the prediction command 41123. In this way, the operation of the robot 10 is switched based on the variable extracted by the knowledge sharing unit 413.

The variables of the knowledge sharing unit 413 also affect the predicted position information 41121 and the predicted importance degree 41122 in addition to the prediction command 41123 generated by the time-series learning unit 4112. That is, the position of the heat map 41131 and the radius of the emphasized portion can be controlled based on the variable of the knowledge sharing unit 413, and an object to be focused can be switched based on the instruction information. Since such control is determined based on knowledge and learning experience, the attention mechanism can be considered as the top-down attention mechanism.

As described above, the time-series learning unit 4112 to which the instruction information is input via the knowledge sharing unit 413 predicts, based on the plurality of pieces of object position information 41111 recognized by the object recognition unit 4111, the predicted position information 41121 and the predicted importance degree 41122 of the object important for the operation of the robot 10. Further, the time-series learning unit 4112 can output the prediction command 41123 obtained by predicting an operation command related to the instruction. Therefore, the model definition unit 41 optimizes the parameters of the model constituting the learning device 40 to estimate, based on various sensors and the instruction information at the time point t, the operation command value of the robot 10 at the time point t+1.

In deep learning, processing of adjusting parameters of a network little by little is called learning. Further, the sensor information and the like at the time point t are input, and the learning is repeated until an error between a predicted value at the time point t+1 and a true value is the minimum, or until an identified number of learnings is reached. The predicted image is generated based on the heat map 41131. Therefore, if the attention point and the importance degree are appropriately directed to the object to be grasped, an input and output error is inevitably small.

<Hardware Configuration of Information Processing Device>

FIG. 5 is a diagram showing an example of a hardware configuration of an information processing device 100 according to the embodiment. The information processing device 100 is a device for implementing functions of the respective functional units provided in the learning device 40 shown in FIG. 2, and for example, a computer device is used.

The information processing device 100 includes a CPU 110, a ROM 120, a RAM 130, an external memory 140, a display unit 150, an input unit 160, a communication I/F 170, and a system bus 180.

The CPU 110 integrally controls operations of the information processing device 100, and controls the robot system 1000 via the system bus 180.

The ROM 120 is a nonvolatile memory that stores control programs and the like necessary for the CPU 110 to execute processing. The program may be stored in an external memory or a detachable storage medium. The ROM 120, the external memory, and the detachable storage medium are used as an example of a computer-readable non-transitory storage medium storing a program executed by the information processing device 100.

The RAM 130 is a main memory of the CPU 110 and functions as a work area or the like. That is, when executing the processing, the CPU 110 loads a necessary program or the like read from the ROM 120 into the RAM 130 and executes the program or the like to execute various functional operations. The CPU 110, the ROM 120, and the RAM 130 are linked to implement processing of each unit in the learning device 40.

The external memory 140 can store various types of data (information) necessary for the CPU 110 to perform processing using a program. The external memory 140 can store various types of data and various types of information obtained by the CPU 110 performing the processing using the program. Since the external memory 140 includes the storage device 20 shown in FIG. 2, each piece of data in the storage device 20 is stored in the external memory 140.

The display unit 150 includes a monitor such as a liquid crystal display (LCD). The display unit 150 displays the captured image which is the visual information of the robot 10, the heat map 41131 predicted by the learning device 40, and the predicted image, thereby displaying position information of the object extracted from the captured image by the learning device 40 and predicted position information of the object.

The input unit 160 includes a pointing device such as a keyboard or a mouse, and is implemented to be able to give an instruction to the information processing device 100 by a person.

The communication I/F 170 is an interface for communicating with an external device (the robot 10 and the storage device 20 in the embodiment). The communication I/F 170 may be, for example, a LAN interface. The system bus 180 communicably connects the CPU 110, the ROM 120, the RAM 130, the external memory 140, the display unit 150, the input unit 160, and the communication I/F 170.

The functions of the units of the information processing device 100 shown in FIG. 5 can be implemented by the CPU 110 executing the program. However, a part of the units of the information processing device 100 shown in FIG. 5 may be implemented to operate with dedicated hardware. In this case, the dedicated hardware operates under the control of the CPU 110.

<Processing Example of Robot System>

Next, an example of processing performed in the robot system 1000 will be described with reference to FIGS. 6 to 8.

(Operation Teaching Processing)

FIG. 6 is a flowchart showing an example of operation teaching processing performed by the robot system 1000. The operation teaching processing is processing of teaching a target operation by a person to the robot 10 and accumulating a result obtained by the measurement unit 11 measuring the operation of the robot 10 as the robot sensor data in the robot sensor data accumulation unit 21. Hereinafter, an alphabet S denotes a step in the flowchart.

First, a person teaches a target operation to the robot 10 (S11). As a teaching method to the robot 10, any method is used, such as operation teaching by remote control using a remote control device (not shown), direct teaching in which a person directly holds the robot, and a method in which a person pre-programs and reproduces a target operation.

Next, the measurement unit 11 of the robot 10 measures sensor values of each drive unit 12 in time series and outputs the values to the storage device 20 as the robot sensor data. The robot sensor data accumulation unit 21 of the storage device 20 stores and accumulates the robot sensor data input from the robot 10 (S12).

Next, the training data accumulation unit 23 reads at least one piece of robot sensor data accumulated in the robot sensor data accumulation unit 21. Then, the training data accumulation unit 23 refers to the instruction information 30 corresponding to the robot sensor data from the instruction data accumulation unit 22, and integrates the robot sensor data and the instruction information 30 as training data (S13). Here, for example, the instruction information 30 including the language instruction referred to as "pick up red object" and a series of robot sensor data measured in an operation of grasping a red object by the robot 10 and moving the robot 10 to a predetermined position are integrated.

Further, the training data accumulation unit 23 stores and accumulates the training data (S14), and ends the processing.

(Operation Learning Processing)

FIG. 7 is a flowchart showing an example of operation learning processing performed by the robot system 1000. The operation learning processing is processing of learning a model defined by the model definition unit 41 of the learning device 40 using the training data accumulated in the training data accumulation unit 23 and storing various types of parameter information (weights) constituting the model in the weight storage unit 43.

First, the learning unit 42 reads the training data accumulated in the training data accumulation unit 23 (S21). As described above, the training data includes the robot sensor data and the instruction information 30.

Next, the learning unit 42 reads the model from the model definition unit 41 (S22). When the robot 10 grasps an object as described above, the learning unit 42 reads a model different from that in a case of pushing the object.

Next, the learning unit 42 learns the training data read from the training data accumulation unit 23 and the model read from the model definition unit 41 (S23). The learning is to optimize the model by the learning unit 42 so as to follow the objective function identified by a person. The model after the learning is referred to as a learned model.

Then, the learning unit 42 stores the learned model (S24). The storage of the learned model is processing in which the learning unit 42 stores various parameters (weights) implemented as the learned model in the weight storage unit 43.

(Operation Generation Processing)

FIG. 8 is a flowchart showing an example of operation generation processing performed by the robot system 1000. The operation generation processing is processing in which the learning device 40 generates a command of a sequential operation for the robot 10 to achieve the target operation based on the sensor information measured by the measurement unit 11.

In the operation generation processing, the inference unit 44 predicts an operation command of the robot 10 using the model read from the model definition unit 41, and outputs the prediction command 41123 to the drive unit 12.

First, the inference unit 44 reads a model defined by a person from the model definition unit 41 (S31). Here, a model according to the target operation of the robot 10 is also read.

Next, the inference unit 44 reads, from the weight storage unit 43, various parameters (weights) constituting the model obtained in the operation learning processing shown in FIG. 7 (S32). Then, in the processing after step S33, the inference unit 44 applies the weight to the model, predicts the intention of the instruction in the instruction information 30, and generates the prediction command 41123 for causing the robot 10 to perform the target operation. In the inference processing, the inference unit 44 generates the prediction command for the target operation corresponding to the instruction information 30 using the model (learned model) optimized in the operation learning processing shown in FIG. 7.

Therefore, along with the operation of the robot 10, the inference unit 44 acquires various types of sensor data measured by the measurement unit 11 from the training data accumulation unit 23 (S33).

Next, the inference unit 44 estimates the operation command value of the robot 10 (S34). The estimated operation command value is output to the drive unit 12 of the robot 10 as the prediction command 41123. The drive unit 12 of the robot 10 drives each device of the robot 10 based on the prediction command 41123.

A driving state of the robot 10 is measured by the measurement unit 11 in real time, and is input to the inference unit 44 as the robot sensor data. Therefore, the inference unit 44 determines, based on the robot sensor data, whether the target operation of the robot 10 indicated by the operation command value inferred in step S34 is completed (S35).

When it is determined that the target operation is not completed (NO in S35), that is, when the inference unit 44 determines that the robot 10 is in the middle of executing the target operation, the processing returns to step S33, and the processing from step S33 onwards is repeated until the generation of the target operation is completed. For example, when the robot 10 is in the middle of stretching an arm, it is determined that the target operation is not completed. In this case, the drive unit 12 performs an operation of stretching the arm in response to the prediction command 41123 to stretch the arm a little more to the position where the object is located.

On the other hand, when the target operation is completed (YES in S35), that is, when the inference unit 44 determines that the robot 10 achieves the execution of the target operation, the processing ends. For example, when the robot 10 stretches the arm to the predetermined position and the operation of picking up the instructed object with an end effector is completed, it is determined that the target operation is completed.

By repeating the above steps, the inference unit 44 can sequentially generate the prediction command 41123 based on the sensor information measured by the measurement unit 11 until the robot 10 achieves the target operation, and output the prediction command 41123 to the robot 10.

The learning device 40 according to the first embodiment described above learns the relationship between the abstract instruction and the operation of the robot 10 for the instructed object. Therefore, even in a situation in which the instruction information 30 to the input robot is not clear and the object to be operated by the robot is unclear, the learning device 40 can predict the intention of the instruction and cause the robot 10 to perform any operation. In this way, even if the instruction is an ambiguous instruction that is difficult to recognize only by image recognition, the learning device 40 can implement the manipulation operation of the robot 10 by predicting one probable object among a plurality of objects and enabling trajectory planning for the object.

Here, the learning unit 42 of the learning device 40 learns the model read from the model definition unit 41 using the training data in which the robot sensor data and the instruction information 30 are associated, and stores the parameter (the weight) in the weight storage unit 43. At this time, the learning unit 42 determines, based on the captured image at the time point t and the robot sensor data, a predicted position of the object at the time point t+1. At this time, the operation of the robot 10 can be generated based on the language instruction learned by the knowledge sharing unit 413 using the variable of the knowledge sharing unit 413. Therefore, the operation learning unit 411 can predict an object instructed by an ambiguous instruction word such as the Japanese "ko-so-a-do demonstratives" and generate the prediction command 41123 for driving the robot 10. In addition, the instruction learning unit 412 can output the prediction instruction information even if the language instruction fluctuates, such as the ambiguous instruction such as the Japanese "ko-so-a-do demonstratives" or an instruction in which the subject and object are placed before each other.

Further, it is assumed that the instruction information 30 includes a language instruction such as "pick up red object" and a language instruction "push blue object" and that the instruction information 30 is already learned. In this case, even if the instruction information 30 including an unlearned language instruction of "push red object" is input, the learning device 40 can predict the language instruction of "push red object" by combining the already learned language instruction "pick up red object" with the language instruction "push blue object". Further, the learning device 40 can cause the robot 10 to perform an operation according to a new language instruction based on the predicted language instruction.

Second Embodiment

Next, a configuration example of a learning device according to a second embodiment of the invention will be described with reference to FIG. 9. In the learning device according to the second embodiment, the instruction information is directly input to the knowledge sharing unit.

FIG. 9 is a block diagram showing an example of a model according to the second embodiment.

An instruction learning unit 412A differs from the instruction learning unit 412 according to the first embodiment in two major points. The first point is that an operation instructed from the input instruction information 30 is not predicted. The second point is that the instruction learning unit 412A is implemented to take in the knowledge sharing unit 414, and the knowledge sharing unit 414 can share information obtained by compressing the language instruction of the instruction information 30 with the time-series learning unit 4112.

Here, combining the instruction information 30 that is input in various forms even if the instructions have the same intention into one piece of information is called compression. By compressing the language instructions of the instruction information 30 by the instruction learning unit 412A, for example, even if the instructions are in different languages, the language instructions can be combined into the same information.

For example, the knowledge sharing unit 414 of the instruction learning unit 412A does not predict the language instruction and compresses the instruction information 30 instead of predicting the language instruction. Therefore, it is possible to cope with even the first instruction information 30. For example, even if the instruction information 30 is in a foreign language other than Japanese (English, French, and the like), a network 4122 provided as a translation unit translates the instruction information 30 into Japanese, so that the expression is the same to a certain degree.

Therefore, the instruction learning unit 412A is provided with the network 4122 defined by the model read from the model definition unit 41. As the network 4122, for example, a network or a program capable of executing translation processing of translating a certain language into another language may be used. Therefore, the instruction information 30 included in the training data passes through the network 4122 and is input to the knowledge sharing unit 414 as a language instruction that can be interpreted by the time-series learning unit 4112.

The language instruction obtained by converting the instruction information 30 by the network 4122 can be regarded as compressed information. Further, the knowledge sharing unit 414 extracts features of the converted language instruction and assigns variables to the features of the language instruction. According to such processing, even if the instruction is performed in different languages, the operation learning unit 411 can generate a predicted image and a prediction command which can be operated by the robot 10 and operate the robot 10. The instruction information 30 including fluctuating language instructions even in the same language pass through the network 4122, and thus being compressed into an instruction with the same expression to a certain degree.

In this way, in the operation learning processing of the robot 10, the learning unit 42 directly acquires the instruction information 30 instead of reading the instruction information 30 from the training data accumulation unit 23. Further, the learning unit 42 compresses the language instructions based on the instruction information 30.

The instruction learning unit 412A compresses the input instruction information 30 and predicts the intention of the instruction information 30 based on the compressed instruction information 30. Further, the instruction learning unit 412A includes the knowledge sharing unit 414 that shares, with the operation learning unit 411, a learning result obtained by learning a correspondence between the intention of the instruction information 30 and the measurement information measured by the operation of the robot 10 to which the target operation is taught.

The knowledge sharing unit 414 learns one variable in response to the operation of one robot 10 and the language instruction passed through the network 4122. The variables learned by the knowledge sharing unit 414 are output to the time-series learning unit 4112.

The time-series learning unit 4112 outputs the time-series predicted position information 41121 and the predicted importance degree 41122, which are learned based on the object position information 41111 obtained from the captured image by the object recognition unit 4111, the sensor information 41112, and the variable input from the knowledge sharing unit 414. Here, the time-series learning unit 4112 may learn the time-series predicted position information 41121 and the predicted importance degree 41122 based on line-of-sight information obtained by measuring a line of sight of a person using a sensor such as a line-of-sight measurement device.

A specific example of the operation of the learning device 40 according to the second embodiment will be described. Here, it is assumed that there are a plurality of red objects and the language instruction is "pick up red object". In this case, the learning device 40 predicts one red object from the plurality of red objects, so that the robot 10 recognizes and grasps the predicted red object. In addition, when the language instruction is "pick up rightmost red object", the inference unit 44 outputs the prediction command 41123 for causing the robot 10 to grasp a "red object" at the "rightmost" position within an imaging view angle of the camera. Therefore, the robot 10 can grasp the "red object" at the "rightmost" position within the imaging view angle of the camera.

In the learning device 40 according to the second embodiment described above, even if the language instruction having the same content is given in a plurality of different languages, the knowledge sharing unit 414 can have information obtained by compressing the instruction information 30 based on a result of translating the language instruction. Since a specific variable is assigned to the compressed instruction information 30, the time-series learning unit 4112 outputs the prediction command 41113 corresponding to the variable based on the variable acquired from the knowledge sharing unit 414. Further, the drive unit 12 can operate the robot 10 based on the prediction command 41113. In this way, in the learning device 40 according to the second embodiment, it is also possible to cause the robot 10 to perform any operation based on the instruction information 30 according to an unclear language instruction.

[Modification]

(Data Format of Instruction Information)

The instruction information 30 input to the instruction learning unit 412 may be formed in various data formats. For example, in the case of text information, the instruction data accumulation unit 22 may convert the whole text into a certain vector or may divide the whole text into word units and then convert the word units into a vector to be input. When the instruction information 30 is voice information, a voice waveform may be input as time-series data, or the voice waveform may be input as one vector. Further, the instruction information 30 obtained by converting the voice waveform into a text or the like may be input. In addition, an assembly diagram showing a state during assembly of an object, an image of a state in which a person performs assembly, a moving image, or the like may be input as the instruction information 30.

In addition, the Japanese "ko-so-a-do demonstratives" such as "pick that up" may be used for the first time as the language instruction. In this case, the fact that the object predicted by the learning device 40 is different from the object intended by an instructor is found by the heat map 41131 displayed on the display device 50 or the object actually grasped by the robot 10. If the object is different from the object intended by the instructor in this way, the instructor inputs to the learning device 40 that the intended object is different. The learning device 40 then re-predicts the position of the object and re-predicts the object to be grasped by the robot 10.

It is to be understood that the invention is not limited to the embodiments described above, and various other applications and modifications may be made without departing from the scope of the invention described in the claims.

For example, in each of the embodiments described above, the configuration of the device and the system is described in detail and specifically in order to facilitate understanding of the invention, and the invention is not necessarily limited to having all the configurations described above. A part of a configuration of the embodiments described here can be replaced with a configuration according to another embodiment, and it is also possible to add the configuration of another embodiment to the configuration of a certain embodiment. A part of a configuration according to each embodiment may be added, deleted, or replaced with another configuration.

Control lines and information lines indicate what is considered to be necessary for explanation, and not necessarily all control lines and information lines are always shown on a product. Actually, almost all configurations may be considered to be connected to one another.

REFERENCE SIGNS LIST

10: robot
11: measurement unit
12: drive unit
20: storage device
21: robot sensor data accumulation unit
22: instruction data accumulation unit
23: training data accumulation unit
30: instruction information
40: learning device
41: model definition unit
42: learning unit
43: weight storage unit
44: inference unit
50: display device
100: information processing device

The invention claimed is:
1. A learning device comprising:
a model definition unit in which a model according to a target operation of a robot is defined;
a learning unit configured to learn, using the model read from the model definition unit according to the target operation of the robot, measurement information in which an operation of the robot is measured, a captured image in which an object to be operated by the robot is imaged, and instruction information including an instruction word in which an operation instruction to the robot is verbalized;
a weight storage unit configured to store a weight for the model learned by the learning unit; and
an inference unit configured to, when instruction information to the robot is newly input, apply the weight read from the weight storage unit to the model read from the model definition unit and predict an intention of the instruction information by applying, to the model, newly measured measurement information, a newly captured image, and newly input instruction information to the robot, infer a target operation of the robot and an object to be a target of the target operation, and predict a drive command for causing the robot to perform the target operation according to the predicted intention of the instruction information
wherein the learning unit includes
an operation learning unit configured to learn an operation of the robot to which the target operation is taught based on the training data read from a training data accumulation unit configured to accumulate the measurement information, the captured image, and the instruction information as training data,
an instruction learning unit configured to predict the intention of the instruction information based on a learning result obtained by learning correspondence between the instruction information read from the training data accumulation unit and the measurement information in which the operation of the robot to which the target operation is taught, and
a sharing unit configured to share the learning result of the instruction information by the operation learning unit with the instruction learning unit; and
wherein the operation learning unit includes
an object recognition unit configured to recognize a shape and a position of the object to be operated from the captured image included in the training data read from the training data accumulation unit,
a time-series learning unit configured to learn and predict a position of the object after a predetermined time after the object recognition unit recognizes the shape and the position of the object based on a learning result of the instruction information acquired from the sharing unit and the shape and the position of the object input in time series from the object recognition unit, learn and predict a command to the robot based on the learning result of the instruction information, and
an instruction target estimation unit configured to estimate, based on the position of the object after the predetermined time predicted by the time-series learning unit, an object to which the operation instruction is given based on the instruction information.

2. The learning device according to claim 1, wherein the time-series learning unit is configured to learn and predict an importance degree of the position of the object after the predetermined time, and the instruction target estimation unit is configured to create, based on the predicted position of the object and the importance degree after the predetermined time, a heat map of the object included in the captured image, and apply the model to the heat map to output a predicted image predicted to be imaged after the predetermined time.

3. The learning device according to claim 2, wherein the time-series learning unit is configured to change, based on the learning result of the instruction information acquired from the sharing unit, the position of the object after the predetermined time and the importance degree and the target operation of the robot.

4. The learning device according to claim 2, wherein the inference unit is configured to output the drive command so that the object is a target of the target operation by focusing on the object whose importance degree predicted by the time-series learning unit is higher than the importance degree predicted by others.

5. The learning device according to claim 2, wherein at least one of the heat map, the predicted image, and the predicted command to the robot is output so as to be displayed on a display device.

6. The learning device according to claim 1, wherein the learning unit includes
   an operation learning unit configured to learn an operation of the robot to which the target operation is taught based on the training data read from a training data accumulation unit configured to accumulate the measurement information, the captured image, and the instruction information as training data, and
   an instruction learning unit configured to compress the input instruction information and predict the intention of the instruction information based on the compressed instruction information, and
   the instruction learning unit includes a sharing unit configured to share, with the operation learning unit, a learning result obtained by learning a correspondence between the intention of the instruction information and the measurement information measured by the operation of the robot to which the target operation is taught.

7. A robot control system comprising:
a robot configured to operate according to a target operation;
a storage device configured to accumulate measurement information obtained by measuring an operation of the robot, a captured image obtained by imaging an object to be operated by the robot, and instruction information including an instruction word in which an operation instruction to the robot is verbalized; and
a learning device configured to output a drive command for causing the robot to perform the target operation based on the information read from the storage device, wherein
the learning device includes
   a model definition unit in which a model according to the target operation is defined,
   a learning unit configured to learn the measurement information, the captured image, and the instruction information using the model read from the model definition unit according to the target operation,
   a weight storage unit configured to store a weight for the model learned by the learning unit, and
   an inference unit configured to, when instruction information to the robot is newly input, apply the weight read from the weight storage unit to the model read from the model definition unit and predict an intention of the instruction information by applying to the model newly measured measurement information, a newly captured image, and newly input instruction information to the robot, infer a target operation of the robot and an object to be a target of the target operation, and predict a drive command for causing the robot to perform the target operation according to the predicted intention of the instruction information
wherein the learning unit includes
   an operation learning unit configured to learn an operation of the robot to which the target operation is taught based on the training data read from a training data accumulation unit configured to accumulate the measurement information, the captured image, and the instruction information as training data,
   an instruction learning unit configured to predict the intention of the instruction information based on a learning result obtained by learning correspondence between the instruction information read from the training data accumulation unit and the measurement information in which the operation of the robot to which the target operation is taught, and
   a sharing unit configured to share the learning result of the instruction information by the operation learning unit with the instruction learning unit; and
wherein the operation learning unit includes
   an object recognition unit configured to recognize a shape and a position of the object to be operated from the captured image included in the training data read from the training data accumulation unit,
   a time-series learning unit configured to learn and predict a position of the object after a predetermined time after the object recognition unit recognizes the shape and the position of the object based on a learning result of the instruction information acquired from the sharing unit and the shape and the position of the object input in time series from the object recognition unit, learn and predict a command to the robot based on the learning result of the instruction information, and
   an instruction target estimation unit configured to estimate, based on the position of the object after the predetermined time predicted by the time-series learning unit, an object to which the operation instruction is given based on the instruction information.

* * * * *